Figure 1:
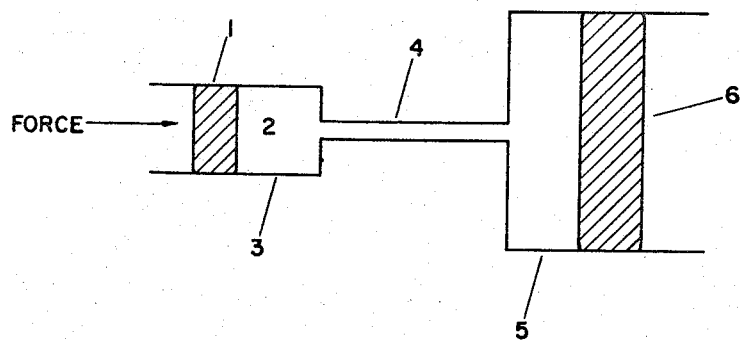

Oct. 3, 1967  R. E. DE BRUNNER ET AL  3,345,435

FLUORINE-CONTAINING PHOSPHINATES

Filed April 30, 1964

INVENTORS
EDWARD S. BLAKE
GEORGE A. RICHARDSON
BY    RALPH E. DeBRUNNER

ATTORNEY

3,345,435
FLUORINE-CONTAINING PHOSPHINATES
Ralph E. De Brunner, Edward S. Blake, and George A. Richardson, Dayton, Ohio, assignors to Monsanto Research Corporation, St. Louis, Mo., a corporation of Delaware
Filed Apr. 30, 1964, Ser. No. 363,786
5 Claims. (Cl. 260—961)

This invention relates to fluorine-containing organic compounds of phosphorus and more particularly provides certain new and valuable fluorine-containing phosphinates and the method of preparing the same. The invention also provides functional fluid compositions comprising some of the new compounds, and methods of actuating a power-transmitting device wherein said compositions are employed.

According to the invention, the presently provided, fluorine-containing phosphinates are prepared by the reaction of certain dialkylphosphinic halides with certain fluorine-substituted phenols, substantially according to the scheme:

wherein alkyl has from 1 to 8 carbon atoms, X is halogen having an atomic weight greater than 34 and less than 126, ar is an aromatic hydrocarbon radical which is free of olefinic and acetylenic unsaturation, contains from 6 to 12 carbon atoms and is linked through nuclear carbons to the remainder of the molecule, and $n$ is one or two.

The presently useful dialkylphosphinic halides include the simple or mixed dialkylphosphinic chlorides or bromides, e.g., dimethylphosphinic chloride or bromide, diethylphosphinic bromide or chloride, di-n-propyl- or diisopropylphosphinic chloride or bromide, di-n-butyl-, diisobutyl- or di-tert-butylphosphinic chloride or bromide, dipentylphosphinic chloride or bromide, dihexylphosphinic bromide or chloride, diheptylphosphinic chloride or bromide, bis(2-ethylhexyl)phosphinic chloride or bromide, dioctylphosphinic chloride or bromide, ethylpropylphosphinic choloride or bromide, butyl-2-ethylhexylphosphinic chloride or bromide, etc. The phenol reactant may have one or two fluorine atoms attached to an aromatic nucleus which may be benzene or naphthalene, and present at said nucleus may also be one or more hydrocarbon substituents, so long as said substituents are free of olefinic and/or acetylenic unsaturation and do not increase the total carbon content of the phenol to more than 12. Examples of suitable phenols are, e.g., o-, m- or p-fluorophenol; 2,3-, 2,4-, 2,5-, 3,4-, 3,5-, or 2,6-difluorophenol; and such phenols containing alkyl, cycloalkyl or aryl substituents as 2-fluoro-4-isopropylphenol, 3,4-difluoro - 2 - ethylphenol, 2-fluoro-4-phenylphenol, 3-fluoro-4-cyclohexylphenol, 4-fluoro - 2 - hexylphenol, and 2,6-difluoro-3,4,5-trimethylphenol; 1-fluoro-2-naphthol, 2,5-difluoro-1-naphthol, 4-ethyl - 2 - fluoro-1-naphthol, etc.

Examples of dialkylphosphinates provided by the invention are the o-, m- or p-fluorophenyl esters of dimethyl-, diethyl-, dipropyl-, diisopropyl-, dibutyl-, dipentyl-, dihexyl-, diheptyl-, or dioctylphosphinic acid which are obtained by reaction of o-, m- or p-fluorophenol with the appropriate dialkylphosphinic bromide or chloride; the o-, m- or p-fluorophenyl esters of mixed phosphinic acids such as ethylisopropyl- or butyloctylphosphinic acid, and the difluorophenyl esters of the simple or mixed dialkylphosphinic acids, e.g., 2,5-difluorophenyl dipentylphosphinate, 2,3-difluorophenyl dihexylphosphinate, 2,6-difluorophenyl diheptylphosphinate, 3,5-difluorophenyl dipentylphosphinate, 2,3-difluorophenyl bis(2-ethylhexyl)phosphinate, or 3,4-difluorophenyl methylpropylphosphinate, which are prepared by reaction of the appropriate difluorophenol with the appropriate dialkylphosphinic chloride or bromide; the 2-fluoro-1-naphthyl or 1-fluoro-2-naphthpl esters of dibutylphosphinic and/or dioctylphosphinic acid; the 4,5-difluoro-2-ethylnaphthyl ester of dimethylphosphinic acid; the 2-fluoro-p-biphenylyl ester of dibutylphosphinic acid or of ethyloctylphosphinic acid, etc.

Reaction of the dialkylphosphinic halide with the fluorine-containing phenol takes place by simply contacting the halide with the phenol at ambient temperature or with heating. In some instances, reaction rate is accelerated by heating and, particularly when working with the higher molecular weight halides, temperatures of from, say, 50° C. to below the decomposition temperature of either the reactants or the ester product are employed. With the lower halides the reaction may be slightly exothermic; so that, for smooth reaction, external cooling may be desirable. Generally, depending upon the nature of the individual reactants, temperatures of from, say, 0° C. to 150° C., and preferably of from, about 15° C. to 125° C. are useful.

The reaction may or may not be conducted in the presence of an inert, organic liquid diluent or solvent, e.g., a halogenated alkane such as chloroform, carbon tetrachloride or ethylene chloride, an ether such as ethyl ether, dioxane, diethylene glycol dimethyl ether, or an amide such as dimethylformamide or dimethylacetamide.

A catalyst may or may not be used. Operation in the presence of a basic agent is recommended, since the latter serves as scavenger for the by-product hydrogen halide. The basic agent may be inorganic or organic, e.g., it may be a tertiary alkylamine such as triethylamine or tributylamine; a heterocyclic nitrogen base such as N-methylmorpholine or pyridine; an alkali or alkaline earth metal oxide or the basic salt thereof such as sodium, potassium, lithium, calcium or magnesium oxide, carbonate or acetate, etc.

All of the reaction conditions, i.e., whether or not a diluent and/or a basic agent is employed and the nature of the diluent or of said agent if it is used, temperature, pressure, reaction time, reactant proportions, etc., can be readily arrived at by easy experimentation. Thus, arrival at optimum reaction conditions is simply a matter of routine procedure by one skilled in the art. Reaction is generally rapid and is usually evidenced by evolution of hydrogen halide if no scavenger is used. When an organic amine is employed as scavenger, reaction is frequently evidenced by copious precipitation of the amine hydrohalide. To assure complete reaction in experimental runs, it is generally recommended that after initial reaction has appeared to subside, the reaction mixture be allowed to stand at room temperature for a time before working up the product or that the temperature of the reaction mixture be increased after sufficient time has elapsed for any exothermic reaction to have occurred.

As has already been pointed out, formation of the presently provided fluorine-containing phenyl dialkylphosphinates takes place by condensation of one mole of a dialkylphosphinic chloride or bromide with one mole of the fluorine-containing phenol. Hence the reactants are advantageously employed in such stoichiometric proportions. However, an excess of the phenol may be employed, and such excess is recommended when it is desired to assure complete reaction of a comparatively more difficulty available dialkylphosphinic halide reactant. Any excess reactant is readily recovered from the final reaction mixture, e.g., by distillation. When a basic scavenger is used, the fluorine-containing phenyl dialkylphosphinate is conveniently isolated from the reaction mixture by first removing the hydrohalide by-product, e.g., through water-washing, and then fractionally distilling the residual organic phase in order to remove any unreacted reactant, organic base, diluent, etc., that may be present. When operating in the absence of a base, it is advantageous, in order to obtain optimum yields, to provide for mechanical removal of the by-product hydrogen halide, e.g., by vigorous agitation of the reaction mixture, dephlegmation, etc.

The presently provided fluoroaryl dialkylphosphinates are stable, well characterized materials which are generally fluid to viscous liquids. They are generally useful as heat-resistant, flame-proofing plasticizers for synthetic resins and plastics, e.g., for polyvinyl chloride, vinyl chloride-vinyl acetate copolymer, polyvinylidene chloride, etc. Those of the present dialkylphosphinates which have a specific viscosity at 25° F. of from 50 to 15,000 centistokes are particularly useful as functional fluids. Such compounds are generally liquid over wide temperature ranges, possess high flash points and high ignition points and are characterized by very good thermal stability. The presently provided fluorophenyl dialkylphosphinates generally remain liquid at temperatures which may be as low as, say —60 F., and they remain liquid at temperatures which are substantially higher than 400° F. Hence they are eminently suited for use as hydraulic fluids, especially in hydraulic systems which are subjected to widely varying temperature conditions. They possess good viscosity/temperature relationships and are also useful, e.g., as heat-exchange media, gyro fluids, and lubricants.

Evaluation of the hydraulic fluid efficacy of the nuclearly fluorine-substituted aryl dialkylphosphinates was conducted by determining such characteristics as pour point, kinematic viscosity, ASTM slope, autogenous ignition temperature and behavior upon sudden exposure to very high temperatures. The following procedures were used to obtain the data given in the following examples.

The pour point was determined by American Society for Testing Materials (hereinafter referred to as ASTM) procedure D97–57.

Kinematic viscosity was determined by ASTM D445–T 1960 procedure, using ASTM kinematic viscosity thermometers which had been calibrated against National Bureau of Standards resistance thermometers.

ASTM slope was determined from the curve plotted from viscosity data on ASTM viscosity temperature chart D341 over the temperature range 100° C. to 210° C.

The flash points and fire points were determined by ASTM D92-57 procedure.

The autogenous ignition temperature was determined by ASTM D2155–60T procedure.

Flammability at 1300° F. was determined by visual observation of the behavior of the test material when introduced dropwise at the surface of molten aluminum which is maintained at 1300° F. If no burning resulted, a single spark was applied for a more stringent test of fire resistance.

Vapor pressure and thermal stability measurements, including the decomposition point, were conducted by employing substantially the method described by E. S. Blake et al., J. Chem. Eng. Data, 6, 87 (1961), using the isoteniscope, constant temperature bath and vacuum handling system. The decomposition temperature is here defined as the temperature at which dp./dt. (rate of pressure change) due to decomposition of the sample is 0.014 mm. Hg/sec.

Figure 2:
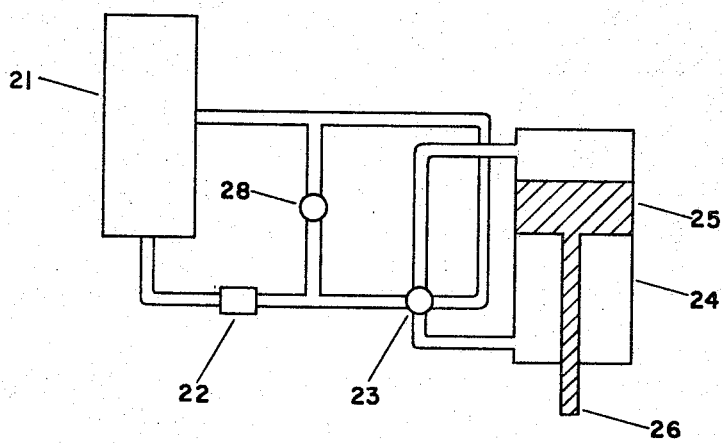

Owing to the excellent physical properties of the present fluorophenyl dialkylphosphinates, the invention provides improved hydraulic systems wherein said phosphinates are employed as the operative fluids. Such systems comprise a displaceable member and a displacing force which is transmitted to said member by means of said fluid, as shown in the schematic diagram of FIGURE 1 of the drawings. Here, a displacing force is applied to piston 1 and transmitted through the fluid 2 contained in cylinder 3 whence it travels through line 4 into cylinder 5 where it acts on the displaceable member 6. In such a system, actuation of a moveable member by the presently provided fluid gives performance characteristics which are outstanding because of the physical properties of the fluid. While hydraulic systems will contain such elements as pumps, valves, cylinders and pistons, the efficacy of the system necessarily depends upon the fluid, since the fluid must be one which can withstand pressure and remain fluid under the conditions of use. FIGURE 2 of the drawings is a schematic diagram which well illustrates the indispensable role of the fluid in cooperation with other components of a hydraulic system. Here the fluid is stored in reservoir 21, and is pumped therefrom by means of pump 22 and through the directional control valve 23 into either end of cylinder 24, where it acts on piston 25 connected by shaft 26 to a motor (not shown) or other device which converts the hydraulic pressure applied to piston 25 into mechanical energy. Action of the fluid on piston 25 displaces the piston until it reaches the end of its travel. The piston may be caused to travel in either direction by adjustment of the directional valve 23. Valve 23 proivdes for return of the fluid from the opposite side of the piston, back to reservoir 21. Relief valve 28 is provided to maintain a constant hydraulic pressure within the system. When a predetermined pressure is reached, the fluid will flow back to reservoir 21 by functioning of said relief valve.

Owing to their very good fire-retarding properties, the fluorophenyl dialkylphosphinates are particularly useful in hydraulic pressure devices that are employed under conditions wherein any leak or break in the hydraulic system could provide great danger from fire. The exceptionally low pour points of the fluids permit fabrication of pressure devices which are destined for use in extremely cold climates, and their very good vapor pressure characteristics and stability to heat allows use of the same devices in hot environments. The viscosity characteristics and ASTM slopes of the fluids makes them of great utility for the transmission of power in a hydraulic system having a pump therein which supplies power for the system, e.g., in a fluid motor comprising a constant- or variable-discharge piston pump which is caused to rotate by the pressure of the hydraulic fluid of the system. The present fluid likewise serves to lubricate moving parts of such hydraulic systems.

For use in a conventional automatic transmission, the presently provided hydraulic fluid is contained in the outer casing of the transmission device, which casing is attached to the usual engine crankshaft and flywheel and rotates therewith. Within the fluid is a coupling comprising an impeller connected to said casing and a turbine which is connected to the drive shaft of the vehicle. The turbine is driven by the motion of the fluid in response to the rotation of the impeller, as the casing to which the impeller is attached is actuated by the crankshaft and flywheel.

The presently described fluorophenyl dialkylphosphinates are particularly suited for use as the operative fluids in hydraulic braking devices owing to their very good vapor pressure characteristics. Under severe operating conditions heat build-up within the brake system is frequently encountered. Unless the fluid remains liquid at the high temperatures thus developed, the hydraulic brake system becomes inoperable since the vaporized fluid becomes compressible. Although much effort has been expended at providing high boiling hydraulic brake fluids, generally materials which are high boiling congeal at low temperatures.

The presently provided fluids have boiling points which are well over 400° F. and some of them do not boil until over 600° F. Hence hydraulic brake systems in which these fluids are used withstand the dangers ensuing from heat build-up. At the same time, owing to the low pour points of the fluids, the system is one which is operable in very cold environment. The present invention thus provides an improved method for applying pressure to a hydraulic brake through a fluid.

The presently provided compounds and mixtures are useful as the hydraulic fluids of hydraulic machines, generally, e.g., lifts, hoists, jacks, lock-gates, presses, etc.

The invention is further illustrated by, but not limited to, the following examples.

*Example 1*

To a solution of 49 g. (0.25 mole) of dibutylphosinic chloride in 100 ml. of dry pyridine there were added 34 g. (0.30 mole) of o-fluorophenol. When the slight exothermic (ca. 35° C.) reaction had subsided, the mixture was then heated to about 65° C. and then allowed to attain room temperature. The reaction mixture was poured onto ice-hydrochloric acid and extracted into chloroform. This organic phase was washed with 5% sodium hydroxide solution, then to neutrality with water and dried. Fractionation of the organic phase gave 51.8 g. (76.1 theoretical yield) of the substantially pure, water-white, liquid o-fluorophenyl dibutylphosphinate, B.P. 112° C./0.05 mm., $n_D^{25}$ 1.4888, and analyzing 62.01% C, 8.30% H, and 11.13% P as against 61.75% C, 8.15% H, and 11.38% P, the respective calculated values for $$C_{14}H_{22}FO_2P$$

Nuclear magnetic resonance analysis for $^{31}P$, using $H_3PO_4$ as standard, gave a chemical shift at −58.9 p.p.m. which is consistent with the phosphinate structure. For $^{19}F$, using $CF_3COOH$ as standard, there was obtained a single, chemical shift at 54.1 p.p.m.

The pour point of the o-fluorophenyl dibutylphosphinate was found to be −60° F. The following kinematic viscosities were determined at the temperatures shown below:

| ° F.: | Centistokes |
|---|---|
| 0 | 402.7 |
| 100 | 10.39 |
| 210 | 2.14 |

The ASTM slope was 0.95.

The autogenous ignition temperature was found to be 900° F. and the compound did not ignite in the 1300° F. molten metal test unless a spark was used. The flash point was 395° F. and the fire point 490° F.

*Example 2* m-Fluorophenol (34.0 g., 0.3 mole) was added to an ice-cooled solution of 59.0 g. (0.30 mole) of dibutylphosphinic chloride in 75 ml. of pyridine. The resulting mixture was stirred for 0.25 hour in the ice bath, at room temperature for 0.75 hour and then allowed to stand overnight at room temperature. It was then poured onto 1 liter of ice containing 100 ml. of concentrated hydrochloric acid, and stirred occasionally until the ice melted. It was extracted with benzene and the benzene layer was washed first with dilute aqueous potassium hydroxide, then with dilute, aqueous hydrochloric acid, and finally with water to neutrality. Fractionation of the washed and dried product, gave 58.0 g. (71% theoretical yield) of the substantially pure m-fluorophenyl dibutylphosphinate, B.P. 125–130° C./0.15–0.20 mm., $n_D^{25}$ 1.4870.

Nuclear magnetic resonance analysis for $^{31}P$ and $^{19}F$ showed single peaks at −57.8 p.p.m. and +32.2 p.p.m., respectively, thus substantiating the asssigned structure.

The pour point of the 3-fluorophenyl dibutylphosphinate was found to be −65° F. The following kinematic viscosities were determined.

| ° F.: | Centistokes |
|---|---|
| 25 | 97.95 |
| 100 | 9.86 |
| 210 | 2.08 |

The ASTM slope was 0.95 at 100–210° F.

A flash point of 389° F. and a fire point of 490° F. were determined. The autoignition temperature was found to be 980° F. for .01 ml. with 3 seconds lag. In the molten metal test at 1300° F. it did not burn in absence of spark.

Temperatures for vapor pressure equal to certain pressures of mercury were determined to be as follows:

| Temp., ° C.: | Pressure, mm. Hg |
|---|---|
| 178 | 10 |
| 246 | 100 |
| 315 | 600 |
| 326 | 760 |

The decomposition temperature was found to be 594° F.

Instead of containing only one of the fluorophenyl dialkylphosphinates, the operative fluid of the present hydraulic systems and methods may be a mixture of the fluorophenyl esters, say, a mixture of isomeric monofluorophenyl or difluorophenyl dialkylphosphinates. In some instances it will be found that compounds having meta- and/or ortho-substitution at the phenyl nucleus possess better fluidity than do the para-substituted compounds. Hence, the choice of compound may depend upon the environment in which the hydraulic pressure device is to be employed. The presently provided fluorophenyl dialkylphosphinates may also be mixed with known hydraulic fluids, e.g., the trialkyl phosphates or the dialkyl arylphosphonates or the aromatic polyethers, so long as the properties of the resulting mixture meet the specifications required of a hydraulic fluid for the intended use. Obviously if the contemplated use places no limitation on such factors as either low- or high-temperature behavior, or if no fire-hazard exists, the present compounds may be used in any proportion. However, if one or more of these factors is important, then care should be observed in preventing an undesired extent of dilution. Generally, at least a major component of the mixture should be the fluorophenyl dialkylphosphinates.

Also, the usual fluid additives, e.g., corrosion inhibitors, antioxidants, viscosity-index improvers, etc., may be added to the present dialkylphosphinates, although for most purposes it will be found that such additives can be dispensed with.

The presently provided compounds are also useful as biological toxicants, e.g., as defoliants and as selective preemergent and foliage contact herbicides. They may be applied to soils or plants in the form of oil-in-water emulsions or in admixture with powdered carriers, adjuvants, etc.

It is to be understood that although the invention has been described with specific reference to particular embodiments thereof, it is not to be so limited since changes and alterations therein may be made which are within the full intended scope of this invention as defined by the appended claims.

What we claim is:

1. A compound of the formula

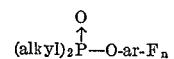

wherein alkyl has from 1 to 8 carbon atoms, ar is an aromatic hydrocarbon radical of from 6 to 12 carbon atoms which is linked through different nuclear carbon atoms to the remainder of the molecule and $n$ is a number of 1 or 2.

2. A compound of the formula

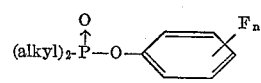

wherein alkyl has from 1 to 8 carbon atoms and $n$ is a number of 1 or 2.

3. Fluorophenyl dibutylphosphinate.
4. o-Fluorophenyl dibutylphosphinate.
5. m-Fluorophenyl dibutylphosphinate.

References Cited

UNITED STATES PATENTS

| | | | |
|---|---|---|---|
| 2,632,018 | 3/1953 | Kosolapoff | 260—461 |
| 3,038,924 | 6/1962 | Schoot et al. | 260—461 |
| 3,074,889 | 1/1963 | Attwood | 252—78 |
| 3,113,110 | 12/1963 | Luechauer | 252—78 |
| 3,149,143 | 9/1964 | Newallis et al. | 260—961 |
| 3,162,672 | 12/1964 | Richert et al. | 260—973 X |

CHARLES B. PARKER, *Primary Examiner.*

A. H. SUTTO, F. M. SIKORA, *Assistant Examiners.*